Sept. 1, 1931.  S. RAPOPORT  1,821,666
VARIABLE FEED FOR STOKERS
Filed Jan. 7, 1931  2 Sheets-Sheet 1
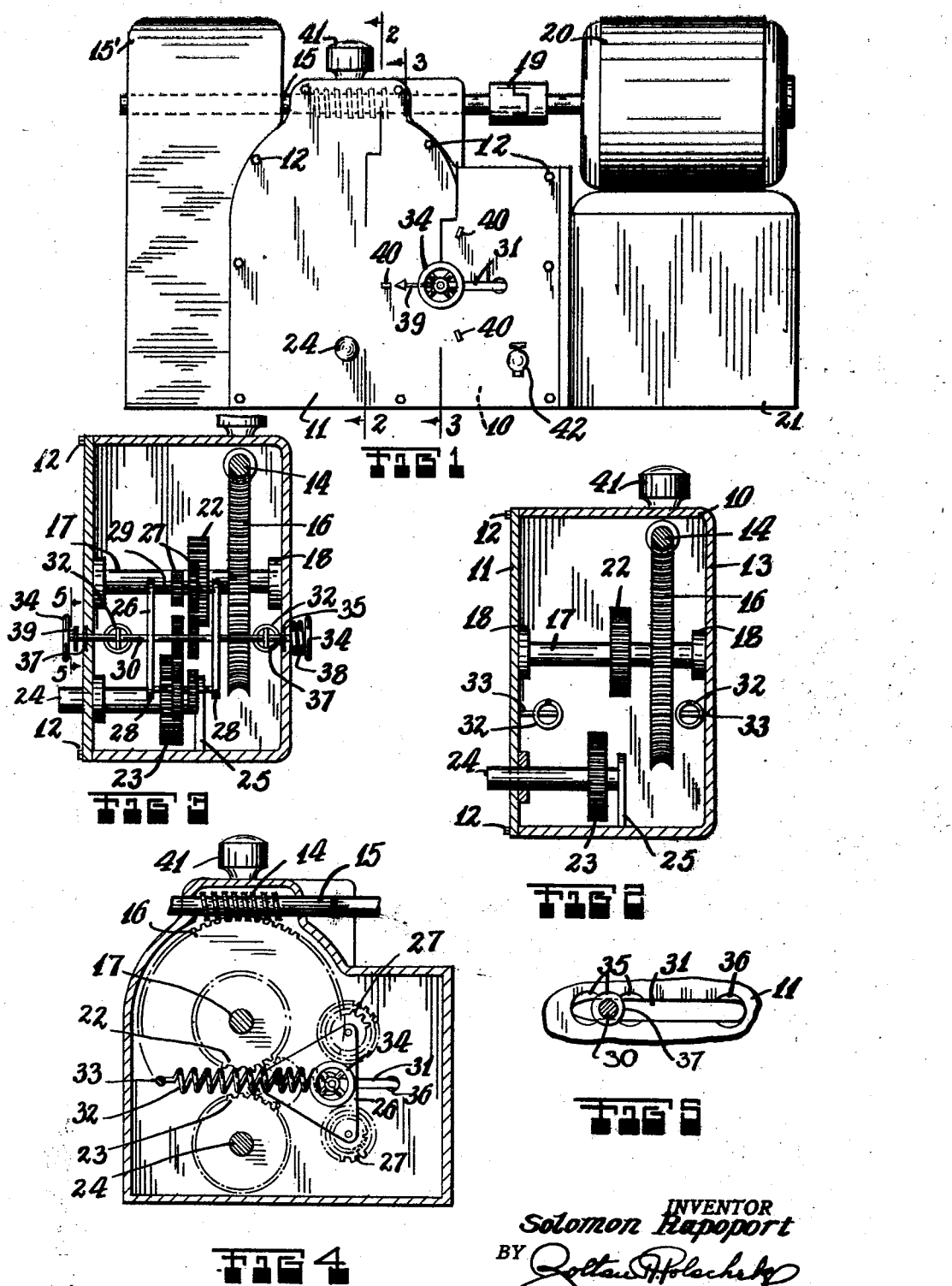
INVENTOR
Solomon Rapoport
BY
ATTORNEY Sept. 1, 1931.　　　　　S. RAPOPORT　　　　　1,821,666
VARIABLE FEED FOR STOKERS
Filed Jan. 7, 1931　　　　2 Sheets-Sheet 2
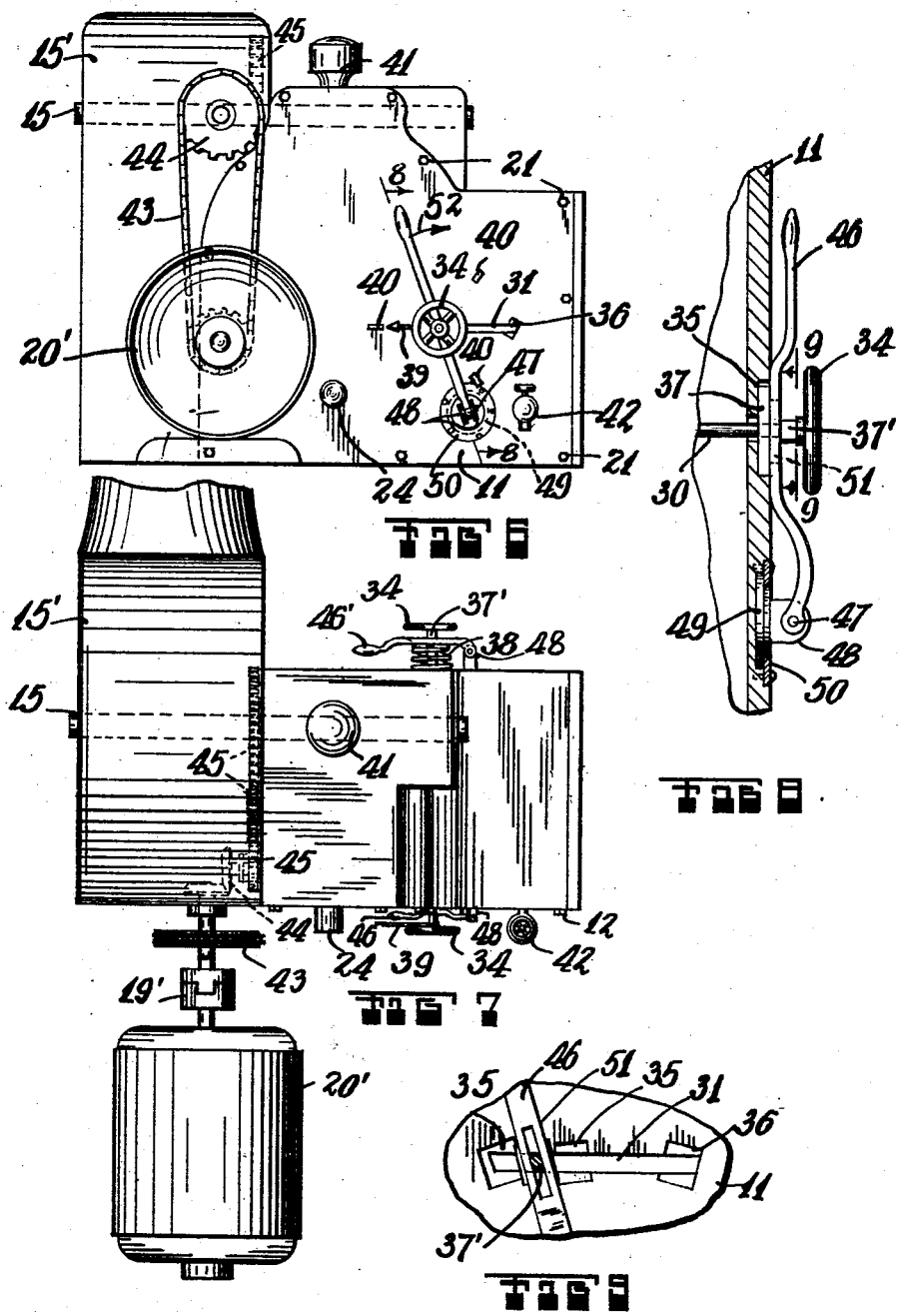
INVENTOR
Solomon Rapoport
BY
ATTORNEY Patented Sept. 1, 1931

1,821,666

UNITED STATES PATENT OFFICE

SOLOMON RAPOPORT, OF BROOKLYN, NEW YORK

VARIABLE FEED FOR STOKERS

Application filed January 7, 1931. Serial No. 507,195.

This invention relates to new and useful improvements in a variable feed for stokers.

The invention has for an object the provision of a variable feed for stokers which is characterized by a speed reduction of approximately 40:1 and arranged to give several speeds.

It is a further object of this invention to provide a large worm engaged by a worm pinion to accomplish the 40:1 reduction.

As a still further object of this invention it is proposed to provide a driven shaft for connection with a feed screw of a stoker, a gear on said driven shaft, another gear spaced from said gear and in a plane adjacent the plane of the first gear for connection with a driver of the reduction unit above mentioned, and a plurality of variable idler gears selectively engageable with said two mentioned gears to accomplish the different speeds.

The invention has for a still further object to provide a frame for supporting the idler gears for engaging the other gears to accomplish the different speeds, to provide a shaft to support said frame and arranging said shaft in slots in a casing, and means for holding the shaft in various adjusted positions within said slots.

As a still further object of this invention it is proposed to resiliently urge said frame in one direction so that the idler gears engage the other gears, to arrange the frame so that it is movable away against said resiliency and turnable to a different position to accomplish a change of speed.

A still further object of this invention is to provide a means to firmly hold said frame against possible motion when the gears are in mesh.

And a still further object of this invention is to construct a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a device constructed according to this invention.

Fig. 2 is a transverse sectional view taken on the line 2—2 of Fig. 1.

Fig. 3 is a transverse sectional view taken on the line 3—3 of Fig. 1.

Fig. 4 is a view of a portion of Fig. 1, but showing the front plate removed to disclose interior parts.

Fig. 5 is an enlarged detailed elevational view of the slot in the casing cover shown in Fig. 1.

Fig. 6 is a similar view to Fig. 1, showing a modified form of the invention.

Fig. 7 is a top plan view of the same.

Fig. 8 is an enlarged detail sectional view taken on the line 8—8 of Fig. 6.

Fig. 9 is a similar view to Fig. 5, taken on the line 9—9 of Fig. 8.

The device comprises a casing 10 of hollow construction and having a front cover 11 held in place by cap screws 12. The cover 11 is parallel with the rear side 13 of the casing. A worm reduction is arranged within the casing and comprises a worm pinion 14 upon a shaft 15 extending from the casing. The worm pinion 14 is in mesh with a worm wheel 16 upon a shaft 17 mounted in bearings 18 within the casing. A coupling 19 upon one end of the shaft 15 serves to connect the shaft with an electric motor 20 fixed upon a pedestal 21 attached on one side of the casing 10. The other end of the shaft 15 is connected to the rotor of a blower 15′.

A gear 22 is fixed upon the shaft 17 of the worm wheel 16 and is in a plane adjacent the plane of a second gear 23 fixed upon a driven shaft 24 for connection with the feed screw of a stoker. The shaft 24 extends from the cover 11 of the casing and is rotatively supported within the casing on a bracket 25. Preferably, the gears 22 and 23 should be so positioned relative to each other that their teeth would mesh if they were in the same plane, or that they be slightly spaced from each other.

A frame 26 is provided which supports a plurality of different sized idler reduction gears 27. This frame comprises spaced triangular plates 28 held in spaced relation by shafts 29 upon which the idlers 27 are mounted. These idlers are in the form of pairs of different sized gears. Each pair of gears is so positioned that when one of the gears meshes with one of the gears 22, the other of the gears may mesh with the gear 23. A stem 30 extends through the frame 26 and extends through slots 31 formed in the casing 10 and in the cover 11. These slots are arranged on the horizontal line in the vicinity of adjacent teeth of the gears 22 and 23.

A means is provided for resiliently urging the frame 26 in one direction so as to mesh one pair of idlers with the gears 22 and 23. This means is in the form of helical springs 32 attached at one of their ends upon the stem 30 and at their other ends upon pegs 33 projecting from the interior of the casing 10 and the cover 11. These springs are arranged on the horizontal line as shown in Fig. 4 and normally urge the frame as before specified.

Handles 34 upon the ends of the stem 30 are positioned outside of the casing so that the stem may be manually moved. A means is also provided for holding the frame 26 in positions in which the idlers are in mesh or out of mesh with the gears 22 and 23. This means is in the form of recesses 35 and 36 formed in the outer face of the cover 10 and in the inner face of the rear side 13 of the casing. These recesses are arranged on the sides of the slots 31. Collars 37 are fixed upon the stem 30 and are normally engageable in any of the recesses 35 or 36. It should be noticed that the recesses 35 are of triple circular construction so that the collars 37 may assume any one of three positions. These three positions should be so designed that in one, one pair of idlers engage the gears 22 and 23, and in another a different pair may engage, and in the third a still different pair. It should be noticed that as shown on the drawings, there are only three pairs of idlers. The recess 36 is a single recess and serves to hold the frame in a position with two of the idlers out of mesh with the gears 22 and 23.

A spring 38 is arranged upon the stem 30 and acts between one of the handles 34 in the side of the casing 13 and serves to normally urge the stem so that the collars 37 tend to engage within the recesses. A pointer 39 is fixed upon the stem 30 and acts over graduation marks 40 upon the cover 11 to direct the position of the frame 26 so that any one of the idlers may be placed into the engaged position when desired.

The operation of the device may be traced by assuming it in the condition as shown in Figs. 1 and 4. Rotations from the motor 20 are transmitted through the worm reduction 14, 16 to the gear 22. From the gear the rotations continue through the idlers 27, shown in contact with the gear in Fig. 4, to the gear 23 and hence to the driven shaft 24 which is intended for connection with the screw of a stoker. To change the speed ratio, it is necessary to manually move one of the handles 34 so as to disengage the collars 37 from the recesses 35, then to move the stem 30 all the way back in the slots 31 and release the stem so that the spring 38 causes the collars 37 to engage the recesses 36. Then the frame 26 may be turned by the handle 34 to a position so that a different pair of the idlers 27 will next engage with the gears 22 and 23 when the frame is allowed to move towards the left again.

Then the handle 34 should be moved so that the flanges 37 disengage from the recesses 36 and the springs 32 remove the frame so that the new idlers engage the gears 22 and 23. This adjustment causes a change in the speed of the device. The device can be rendered inoperative by allowing the flanges 37 to remain engaged in the recesses 36.

A grease or oil cup 41 may also be provided at any suitable place near the top of casing 10 and an oil outlet or gauge 42 preferably near the lower end of the said casing.

In Figs. 6 and 7 electric motor 20' drives the shaft 15 thru a transmission including sprocket wheels and chain 43, bevel gear 44 and spur gears 45. A coupling 19' is provided to connect motor 20' with the said transmission.

The handles 34 may also be moved by a hand lever 46 pivoted at 47 to the lugs 48 of a disc 49 which is rotatably mounted in the cover 11 by a ring 50. The lever 46 is provided with a slot 51 adapted to accommodate and guide the square end 37' of stem 30.

To change the speed ratio handle 46 is first moved away from the cover 11 so as to disengage collars 37 from the recesses 35, then rotate the handle 46 in the direction of the arrow 52 until collars 37 engage recesses 36 due to the tension of spring 38. Then the frame 26 may be turned by handle 34 to a position so that a different pair of idlers 27 will next engage with gears 22 and 23 when the frame 26 is allowed to return by first pulling on handle 46. A handle 46' may also be provided to the rear side 13 of the casing, which is similar to handle 46 but by this handle, collars 37 are released from recesses 35 by pushing the handle toward casing 10.

It is to be understood that the shape of recesses 35 and 36 may be round, rectangular or of any other shape. It is also to be understood that instead of a pair of gears 27 a single wide gear may be used on each shaft 29.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A variable feed for stokers, comprising a casing, a worm reduction within said casing, a gear on the shaft of the worm wheel of said reduction, a second gear in a plane adjacent the plane of said first gear and on a driven shaft for connection with the feed screw of a stoker, a frame supporting a plurality of different sized idler reduction gears, means for resiliently urging one set of said idlers into mesh with said gears, stems projecting from said frame and extending through slots in said casing, handles on said stems, and means for holding said frame with said idlers in or out of mesh.

2. A variable feed for stokers, comprising a casing, a worm reduction within said casing, a gear on the shaft of the worm wheel of said reduction, a second gear in a plane adjacent the plane of said first gear and on a driven shaft for connection with the feed screw of a stoker, a frame supporting a plurality of different sized idler reduction gears, means for resiliently urging one set of said idlers into mesh with said gears, stems projecting from said frame and extending through slots in said casing, handles on said stems, and means for holding said frame with said idlers in or out of mesh, said worm reduction comprises a worm pinion for connection with some source of rotation and meshing with a worm wheel.

3. A variable feed for stokers, comprising a casing, a worm reduction within said casing, a gear on the shaft of the worm wheel of said reduction, a second gear in a plane adjacent the plane of said first gear and on a driven shaft for connection with the feed screw of a stoker, a frame supporting a plurality of different sized idler reduction gears, means for resiliently urging one set of said idlers into mesh with said gears, stems projecting from said frame and extending through slots in said casing, handles on said stems, and means for holding said frame with said idlers in or out of mesh, said frame being in the form of spaced flat members, spindles holding said flat members in the spaced positions, and the idler reduction gears being mounted on said spindles.

4. A variable feed for stokers, comprising a casing, a worm reduction within said casing, a gear on the shaft of the worm wheel of said reduction, a second gear in a plane adjacent the plane of said first gear and on a driven shaft for connection with the feed screw of a stoker, a frame supporting a plurality of different sized idler reduction gears, means for resiliently urging one set of said idlers into mesh with said gears, stems projecting from said frame and extending through slots in said casing, handles on said stems, and means for holding said frame with said idlers in or out of mesh, said means for resiliently urging one of said idlers into mesh with said gears comprises springs acting between said frame and pegs supported on said casing.

5. A variable feed for stokers, comprising a casing, a worm reduction within said casing, a gear on the shaft of the worm wheel of said reduction, a second gear in a plane adjacent the plane of said first gear and on a driven shaft for connection with the feed screw of a stoker, a frame supporting a plurality of different sized idler reduction gears, means for resiliently urging one set of said idlers into mesh with said gears, stems projecting from said frame and extending through slots in said casing, handles on said stems, and means for holding said frame with said idlers in or out of mesh, a pointer being fixed on one of said stems and acts over a graduated scale on the casing to direct the positioning of the idler gears.

6. A variable feed for stokers, comprising a casing, a worm reduction within said casing, a gear on the shaft of the worm wheel of said reduction, a second gear in a plane adjacent the plane of said first gear and on a driven shaft for connection with the feed screw of a stoker, a frame supporting a plurality of different sized idler reduction gears, means for resiliently urging one set of said idlers into mesh with said gears, stems projecting from said frame and extending through slots in said casing, handles on said stems, and means for holding said frame with said idlers in or out of mesh, comprising recesses formed in the casing engageable by flanges on said stems, and resilient means being provided for urging the flanges into the engaged positions.

7. A variable feed for stokers, comprising a casing, a worm reduction within said casing, a gear on the shaft of the worm wheel of said reduction, a second gear in a plane adjacent the plane of said first gear and on a driven shaft for connection with the feed screw of a stoker, a frame supporting a plurality of different sized idler reduction gears, means for resiliently urging one set of said idlers into mesh with said gears, stems projecting from said frame and extending through slots in said casing, handles on said stems, and means for holding said frame with said idlers in or out of mesh, comprising recesses formed in the casing engageable by flanges on said stems, and resilient means being provided for urging the flanges into the engaged positions, said resilient means comprises a coaxial spring upon the stem acting between a member on the stem and the casing.

8. A variable feed for stokers, comprising a casing, a worm reduction within said casing, a gear on the shaft of the worm wheel of said reduction, a second gear in a plane adjacent the plane of said first gear and on a driven shaft for connection with the feed screw of a stoker, a frame supporting a plurality of different sized idler reduction gears, means for resiliently urging one set of said idlers into mesh with said gears, stems projecting from said frame and extending through slots in said casing, handles on said stems, and means for holding said frame with said idlers in or out of mesh, comprising recesses formed in the casing engageable by flanges on said stems, and resilient means being provided for urging the flanges into the engaged positions, handles adapted to disengage the said flanges from holding position, said handles are pivoted to a rotary disc mounted on the said casing.

In testimony whereof I have affixed my signature.

SOLOMON RAPOPORT.